United States Patent
Babin et al.

(10) Patent No.: US 8,282,386 B2
(45) Date of Patent: Oct. 9, 2012

(54) INJECTION MOLDING APPARATUS

(75) Inventors: Denis Babin, Georgetown (CA); Harold Godwin, Fergus (CA); Jiping Qian, Oakville (CA); Yat Kwong Lai, Mississauga (CA)

(73) Assignee: Mold-Masters (2007) Limited, Georgetown, Ontario (CA)

( * ) Notice: Subject to any disclaimer, the term of this patent is extended or adjusted under 35 U.S.C. 154(b) by 0 days.

(21) Appl. No.: 12/691,732

(22) Filed: Jan. 21, 2010

(65) Prior Publication Data
US 2010/0183763 A1 Jul. 22, 2010

Related U.S. Application Data

(60) Provisional application No. 61/146,610, filed on Jan. 22, 2009.

(51) Int. Cl.
*B29C 45/23* (2006.01)
*B29C 45/72* (2006.01)
(52) U.S. Cl. ........ 425/543; 425/547; 425/549; 425/564; 425/572
(58) Field of Classification Search .................. 425/543, 425/547, 548, 549, 552, 572, 588, 564
See application file for complete search history.

(56) References Cited

U.S. PATENT DOCUMENTS

| | | | |
|---|---|---|---|
| 3,037,245 A | 6/1962 | Darnell | |
| 3,091,812 A | 6/1963 | Witkowski | |
| 4,017,242 A | 4/1977 | Mercer | |
| 4,043,726 A | 8/1977 | Tsunemoto et al. | |
| 5,087,190 A | 2/1992 | Laghi | |
| 5,261,806 A | 11/1993 | Pleasant | |
| 5,536,164 A | 7/1996 | Brun, Jr. et al. | |
| 5,738,149 A | 4/1998 | Brun, Jr. et al. | |
| 5,945,139 A * | 8/1999 | Price et al. | 425/543 |
| 6,030,202 A | 2/2000 | Gellert et al. | |
| 6,149,423 A | 11/2000 | Manz | |
| 7,465,165 B2 | 12/2008 | Fischer et al. | |
| 7,699,600 B2 | 4/2010 | Baumann et al. | |
| 7,708,551 B2 | 5/2010 | Jenko et al. | |
| 2002/0132025 A1 * | 9/2002 | Lee et al. | 425/564 |

(Continued)

FOREIGN PATENT DOCUMENTS

DE 44 25 981 A1 1/1996

(Continued)

OTHER PUBLICATIONS

Int'l Search Report and Written Opinion for Int'l Appl No. PCT/CA2010/000047, mailed Mar 18, 2010.

(Continued)

*Primary Examiner* — Tim Heitbrink
(74) *Attorney, Agent, or Firm* — Medler Ferro PLLC

(57) ABSTRACT

An injection molding apparatus includes an inlet component, a plurality of nozzles, and a plurality of hoses, each of which is not heated. The hoses are connected between outlets of the inlet component and respective molding material inlets of the nozzles for conveying molding material from the inlet component to the nozzles. Hoses may also be connected between a rail plate and the nozzles for delivering cooling fluid or actuation fluid for an actuator to and from the nozzles. The nozzles may be fastened to a mold plate of the injection molding apparatus, such as by a threaded bushing. A heated insert may at least partially define the mold cavity to heat molding material in the mold cavity.

23 Claims, 8 Drawing Sheets

U.S. PATENT DOCUMENTS

| | | |
|---|---|---|
| 2009/0108500 A1 | 4/2009 | Jenko |
| 2009/0191301 A1 | 7/2009 | Baumann |
| 2009/0191302 A1* | 7/2009 | Jenko et al. ............... 425/549 |

FOREIGN PATENT DOCUMENTS

| | | |
|---|---|---|
| DE | 101 50 419 A1 | 5/2003 |
| DE | 20 2008 000 608 U1 | 7/2008 |
| FR | 2 620 953 A1 | 3/1989 |
| FR | 2 877 870 A1 | 5/2006 |
| GB | 1 535 164 A | 12/1978 |
| JP | 60-143922 A | 7/1985 |
| JP | 3-013311 A | 1/1991 |
| JP | 2006-007658 A | 1/2006 |

OTHER PUBLICATIONS

Bregard, Bill, "Mold maker adds clean room, will enter LSR molding", PlasticNews.com Aug. 29, 2008.

* cited by examiner

US 8,282,386 B2

INJECTION MOLDING APPARATUS

CROSS REFERENCE TO RELATED APPLICATION

This application claims the benefit under 35 U.S.C. §119(e) of U.S. Appl. No. 61/146,610 filed Jan. 22, 2009, which is incorporated by reference herein in its entirety.

FIELD OF THE INVENTION

The present invention relates to injection molding, and more particularly, to an injection molding apparatus for receiving molding material from an injection screw nozzle of an injection molding machine and delivering molding material to one or more mold cavities.

BACKGROUND OF THE INVENTION

Conveying molding material from an injection screw nozzle of an injection molding machine through a mold inlet and distributing it to one or more mold cavities presents problems when thermoset material is being molded. Since thermoset materials cure when exposed to heat, components associated with distributing molding material to the one or more mold cavities need to be kept cool and cleaned frequently.

Regardless of molding material, thermal expansion in runners and molds presents an ongoing problem. Accommodating thermal expansion efficiently is a challenge in mold and runner design.

Solving these problems individually or at the same time is important to developing advanced injection molding techniques.

BRIEF SUMMARY OF THE INVENTION

Embodiments hereof are directed to an injection molding apparatus.

In an embodiment, an injection molding apparatus includes an inlet component, a plurality of nozzles, and a plurality of hoses. The inlet component includes an inlet for receiving molding material from a source and a plurality of outlets. Each nozzle includes an inlet and a nozzle channel for delivering molding material through a mold gate and into a mold cavity. Each hose is connected between an outlet of the inlet component and an inlet of one of the nozzles for conveying molding material from the inlet component to the connected nozzle. The inlet component, nozzle and hoses do not have heaters in contact therewith. Injection molding apparatus may further include hoses connected between a rail plate and the nozzles for delivering cooling fluid or actuation fluid for an actuator to and from the nozzles.

In another embodiment, an injection molding apparatus an inlet component, a plurality of nozzles, a manifold, and a mold plate adjacent a mold cavity. The inlet component includes an inlet for receiving molding material from a source and a plurality of outlets. Each nozzle includes an inlet and a nozzle channel for delivering molding material through a mold gate and into the mold cavity. The manifold is connected between the outlets of the inlet component and the inlets of the nozzles for conveying molding material from the inlet component to the nozzles. At least one of the nozzles is fastened to the mold plate.

In an embodiment, the nozzle includes a nozzle core that defines the nozzle channel and a cooling channel for flow of coolant to cool the molding material in the nozzle channel. The nozzle core may include two concentric sleeves with the cooling channel disposed between the sleeves. The nozzle may further include a housing in which the nozzle core is disposed, and the housing may include coolant ports connected to the cooling channel and a molding material inlet connected to the nozzle channel. The nozzle may further include an actuator connected to a valve pin for opening and closing the mold gate.

BRIEF DESCRIPTION OF THE FIGURES

The foregoing and other features and advantages of the invention will be apparent from the following description of embodiments thereof as illustrated in the accompanying figures. The accompanying figures, which are incorporated herein and form a part of the specification, further serve to explain the principles of the invention and to enable a person skilled in the pertinent art to make and use the invention. The figures may not be to scale.

DETAILED DESCRIPTION OF THE INVENTION

Specific embodiments of the present invention will now be described with reference to the figures. The following detailed description is merely exemplary in nature and is not intended to limit the invention or the application and uses of the invention. Furthermore, there is no intention to be bound by any expressed or implied theory presented in the preceding technical field, background, summary, or the following detailed description.

Figure 1:
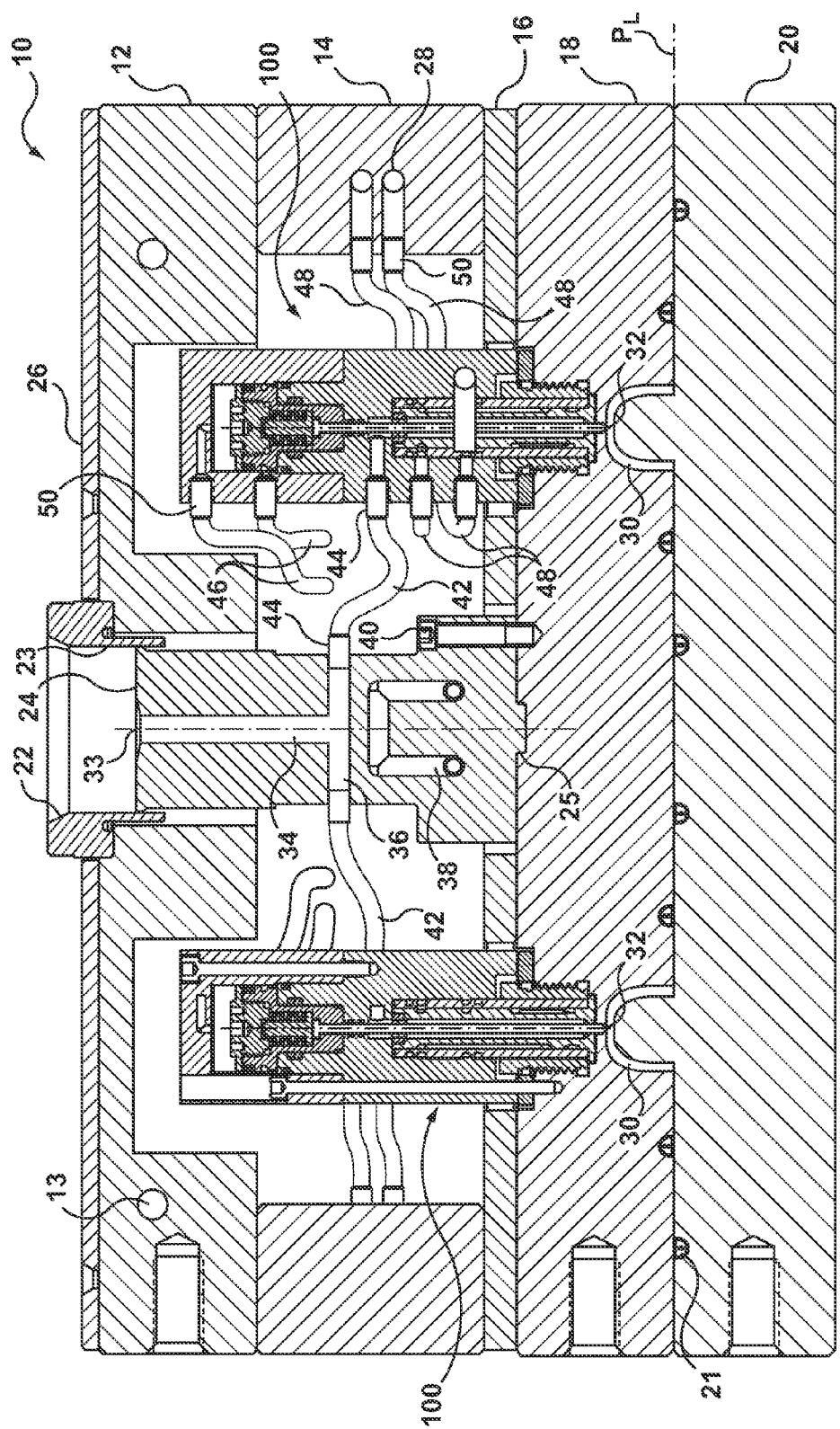
FIG. 1 is a sectional view of an injection molding apparatus according to an embodiment of the present invention.

Embodiments hereof relate to, among other things nozzles and components which can be used in an injection molding apparatus such as the injection molding apparatus 10 shown in FIG. 1. The features and aspects described for the other embodiments may be used accordingly with the present embodiment. In the following description, "downstream" is used with reference to the direction of mold material flow from an inlet of the injection molding system to a mold cavity, whereas "upstream" is used with reference to the opposite direction. Similarly, "forward" is used with reference to a direction towards a parting line between a mold cavity plate and a mold core, whereas "rearward" is used with reference to a direction away from the parting line.

Injection molding apparatus 10 includes a back plate 12, rail plates 14, an insulator plate 16, cavity plate 18 and core plate 20, locating ring 22, inlet component 24, a plurality of nozzles 100, and a plurality of various conduits such as molding material hoses 42, actuator hoses 46, and cooling hoses 48 which connect nozzles 100 to other components.

Back plate 12 may be cooled by circulating a cooling fluid through back plate cooling channels 13 and includes a cover plate 26. Cover plate 26 is optional and may be omitted. When injection molding apparatus 10 is installed in an injection molding machine (not shown), back plate 12 or cover plate 26, if used, provides a surface to mate with the stationary platen (not shown) of the injection molding machine (not shown). Cover plate 26 may be made of insulative material. Non limiting examples of an insulative material for cover plate 26 include any material that is more insulative than the material chosen for back plate 12 such as, titanium, or a non-metal such as fiberglass.

Rail plates 14 have cooling channels 28 for conveying a cooling fluid or coolant to nozzles 10. Inlets (not shown) to cooling channels 28 are provided with fittings for connection to a coolant source (not shown), e.g., a coolant pump or reservoir. In this embodiment, four rail plates 14 are arranged to form a box-like structure that accommodates the components inside. In an alternative embodiment more or fewer rail plates 14 may be used. Rail plates 14 may be of different or same sizes. Rail plates 14 are sandwiched between back plate 12 and cavity plate 18 or between back plate 12 and insulator plate 16, if insulator plate 16 is used.

Insulator plate 16 is made from a more thermally insulating material than the surrounding plates. Non limiting examples of an insulating material for insulator plate 16 include any material that is more insulating than the material chosen for one of either cavity plate 18 or rail plates 14, such as, titanium, or a non-metal such as fiberglass.

Cavity plate 18 together with core plate 20 define one or more mold cavities 30. Molding material is supplied to mold cavities 30 through mold gates 32 provided for in cavity plate 18 by nozzles 100. In an alternative embodiment, a separate mold gate insert is used to define mold gate 32, and a single mold cavity 30 is fed molding material by more than one nozzle 100. Cavity plate 18 and core plate 20 are separable along a parting line $P_L$ to allow molded parts to be ejected from core plate 20 by use of any known ejection means (not shown). Nonlimiting examples of ejection means include: ejector pins, stripper plates, and air assisted ejection. In the current embodiment, at least one of cavity plate 18 and core plate 20 are heated by a heater 21 to cure a thermoset injection molding material, such as liquid silicone rubber. Cavity plate 18 and core plate 20 may also contain thermocouples (not shown) for monitoring the temperature of heaters 21 or the temperature of cavity plate 18, core plate 20, or mold cavity 30 to provide feedback for control of heaters 21. Heaters 21 can be any type of heater such as the embedded resistance wires shown, film heaters, cartridge heaters, or the like. It will be appreciated by one of ordinary skill in the art that cavity plate 18 and core plate 20 could also be heated by providing cavity plate 18 and core plate 20 with channels (not shown), similar in construction to back plate cooling channels 13, and circulating a heated fluid therein.

Injection molding apparatus 10 can include additional components, such as additional mold plates, alignment dowels, mold gate inserts, cooling channels, and bolts, lifting holes, among others without departing from the scope hereof.

Locating ring 22 aligns the molding material outlet of an injection screw nozzle (not shown) of an injection molding machine (not shown), or other source of molding material, with inlet 33 of inlet component 24. The injection screw nozzle (not shown) of the injection molding machine (not shown) feeds pressurized molding material into the inlet channel 34 of inlet component 24 where it is distributed to a plurality of inlet component outlets 36. Inlet cooling channels 38 may be provided in inlet component 24 for circulating a cooling fluid therein to keep the molding material in inlet component channel 34 at the required processing temperature. The coolant source for inlet cooling channels 38 may be one of the cooling channels 28 provided for in rails 14. For support, the upstream end of inlet component 24 is engaged with a bore 23 extending through locating ring 22, while the downstream end of inlet component 24 is engaged with the cavity plate 18 via spigot 25 located on the downstream face of inlet component 24. Bolts or other fasteners 40 may be used to further secure inlet component 24 within injection molding apparatus 10. In another embodiment an insulating ring (not shown) may be provided between the inlet component and the cavity plate to create a thermal break between inlet component 24 and cavity plate 18.

Figure 3:
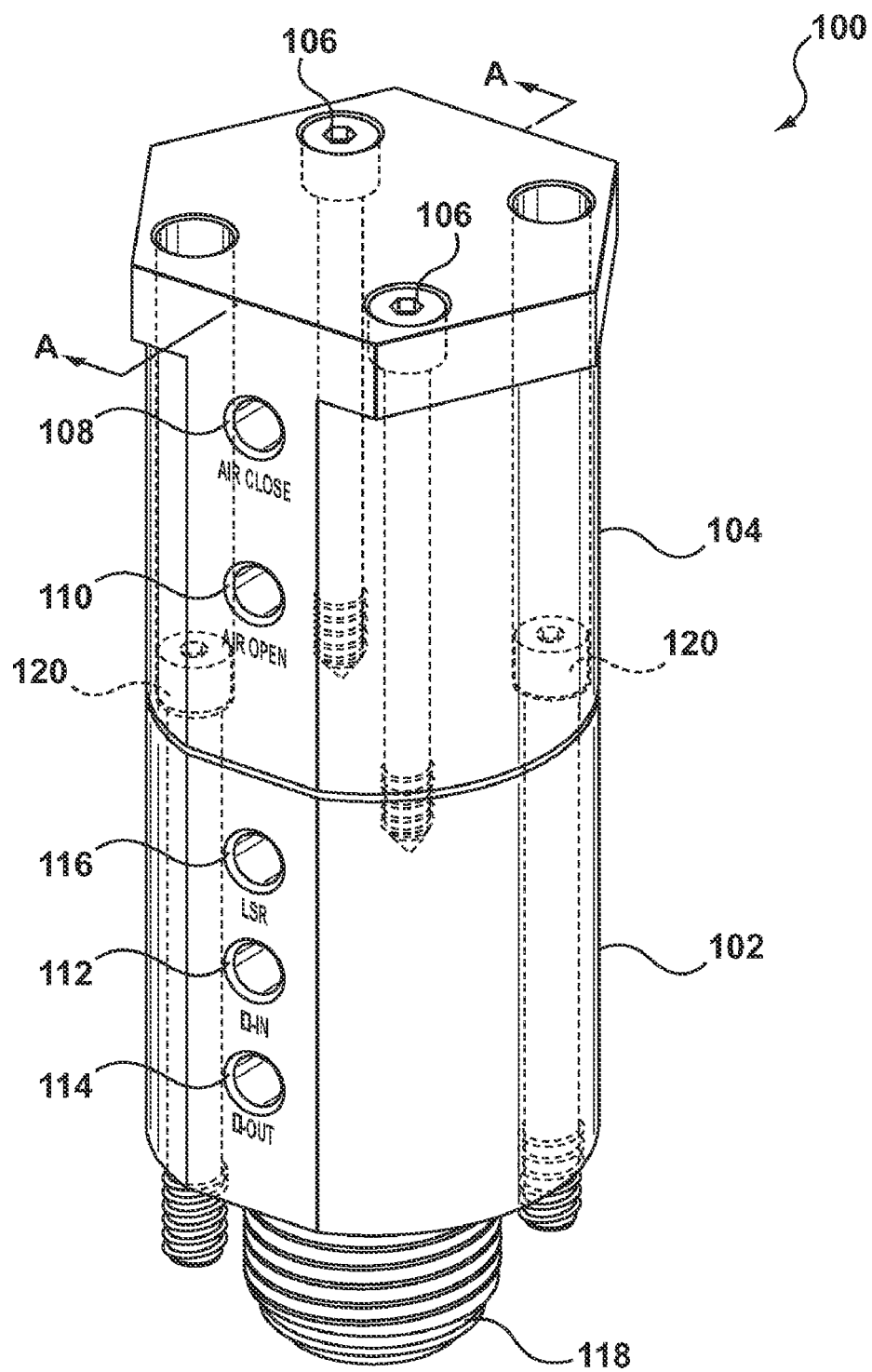
FIG. 3 is a perspective view of a nozzle of the injection molding apparatus of FIG. 1.
Figure 4:
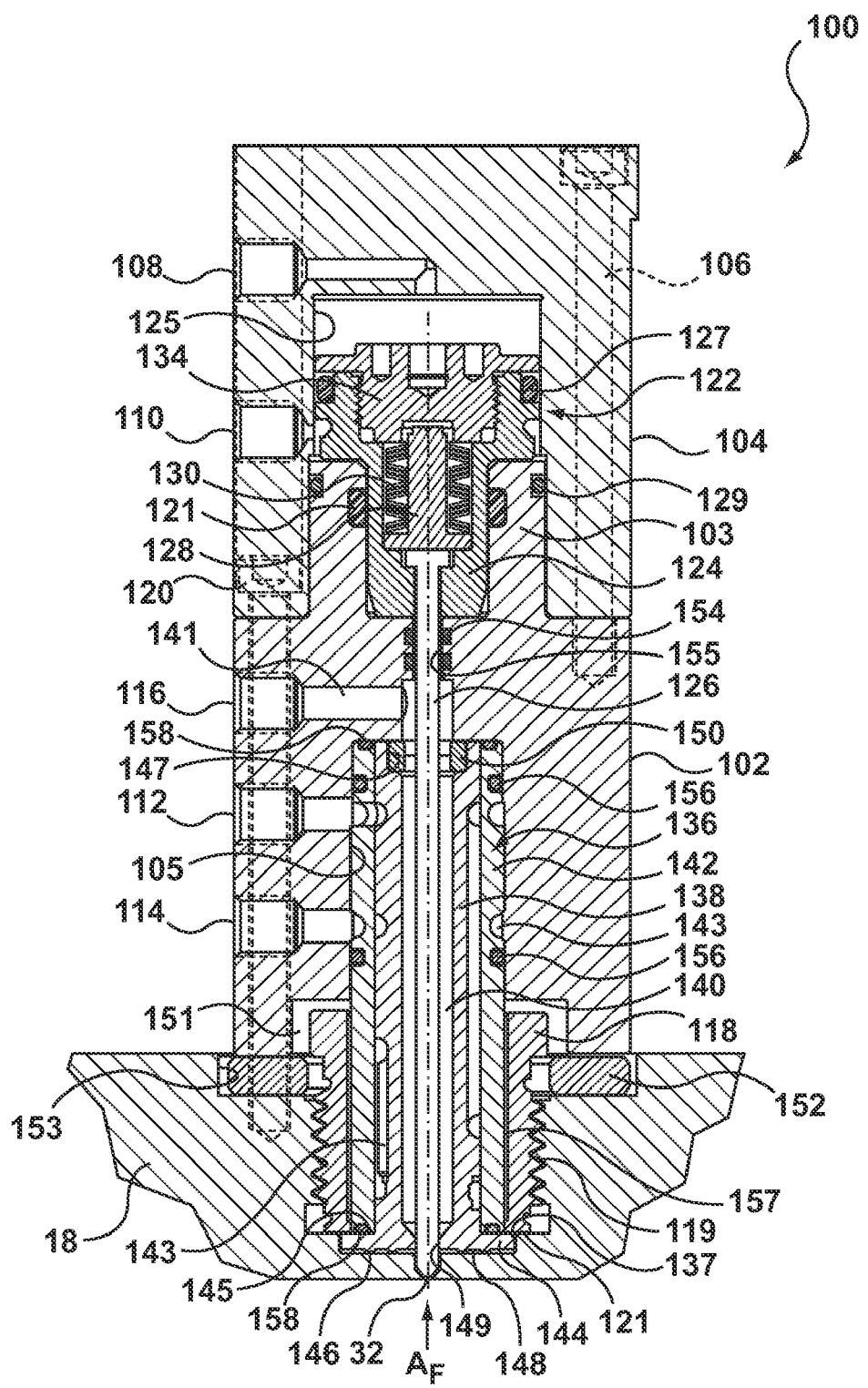
FIG. 4 is a sectional view of the nozzle of FIG. 3 sectioned along line A-A.

Referring now to FIGS. 1, 3, and 4, each of the plurality of nozzles 100 has a molding material inlet 116 for receiving molding material and a nozzle channel 140 for delivering molding material to one of the mold cavities 30. Each nozzle 100 also has a valve pin 126 for opening and closing a respective mold gate 32. In this embodiment, each nozzle 100 has an actuator 122 for actuating the valve pin 126 to open or close mold gate 32 for controlling the flow of molding material into cavity 30. If the actuators 122 depend on a working fluid for operation, i.e. pneumatic or hydraulic types, actuator fluid channels (not shown) may be provided in either rail plate 14 or back plate 12. Should actuators 122 be electric, magnetic or of some other design, electrical conduits (not shown) can be provided. In the current embodiment, nozzles 100 are removably fastened to cavity plate 18. In another embodiment, nozzles 100 are removably fastened to another mold plate, such as insulator plate 16. Nozzles 100 are discussed in more detail below.

Referring now to FIGS. 1 and 3, molding material hoses 42 are connected between inlet component outlets 36 and molding material inlets 116 of nozzles 100 for conveying molding material from inlet component 24 to nozzles 100. Couplings or fittings 44, such as commercially available quick-connectors, threaded hose fittings, crimped couplings, or the like, can be attached at the ends of molding material hoses 42. Couplings 44 may be removable from nozzles 100 and inlet component 24 to permit reasonably quick attachment and detachment therefrom. Couplings 44 may also be removable from molding material hoses 42. Molding material hoses 42 have sufficient flexibility to allow an operator to manually adjust the paths followed by molding material hoses 42. That is, molding material hoses 42 can be manipulated by hand to route molding material hoses 42 to follow a preferred flow path. Accordingly, various positions or orientations of nozzles 100 can be accommodated as illustrated by the different hose paths leading to nozzles 100 in FIG. 1. Further, varied length paths from inlet component outlets 36 to molding material inlets 116 of nozzles 100 may be accommodated by molding material hoses 42. Molding material hoses 42 and couplings 44 are not sectioned in FIG. 1. Connecting and disconnecting couplings 44 may require hand tools.

Molding material hoses 42 may be considered a disposable or consumable item. As well the hose connecting portion, or entirety of each coupling 44 may also be considered disposable or consumable. For example, the molding protocol may designate regular cleaning of components between batches of molding material, after a number of molding cycles, or after a specified duration of operating time molding material hoses 42 and/or couplings 44 may become clogged with degraded molding material and require cleaning or replacement. It may be economical to discard molding material hoses 42 and/or couplings 44 and replace them with new molding material hoses 42 and/or couplings 44. Alternatively, used molding material hoses 42 and/or couplings 44 may be returned to the manufacturer for recycling or refurbishment. The manufacturer or the end user may also cut molding material hoses to length from stock and then attach the couplings.

Molding material hoses 42 should be selected with regard to the molding pressure and resin processing temperature of the specific molding application. Injection pressure can range from 0 to 18,000 psi or higher, and processing temperatures, that is the temperature of molding apparatus 10 upstream from mold cavities 30, can range from 0 to 150 degrees Celsius or higher. In the current embodiment, molding material hoses 42 are braided metal hoses, such as those made with multiple layers of metal wire. Materials such as high-strength steel, stainless steel, or spring steel are typically used for the braiding wire. Molding material hoses 42 may also have internal liners, which should be selected for chemical compatibility with the molding material. Internal liners can be made of materials such as polytetrafluoroethelene, PTFE; sold under the trade name TEFLON, or polyvinylidene fluoride PVDF; sold under the trade name KYNAR. Other materials for the metal braid and the liner can also be used. If operating conditions permit, non-metal hoses can also be used. A nonlimiting example of a non-metal hose is one made of carbon fiber or KEVLAR weave.

Suitable hoses, hoses with attached couplings, or separate couplings are available commercially from companies such as SPIR STAR Druckschläuche of Rimbach, Germany; US Hose Corporation of Romeoville, Ill.; and High Pressure Equipment Company of Erie, Pa.; amongst others.

Alternatively molding material hoses 42 may be substituted with conduits comprised of, for example, stiff tubing. Exemplary tubing is described by Brun, Jr. et al. in U.S. Pat. No. 5,536,164, which is incorporated in its entirety herein by reference. The conduits in Brun '164 are relatively stiff when compared to hoses and are also heated. However, the heaters in Brun '164 may be omitted if such conduits are used in applications where heat is not required to maintain the molding material in a flowable state.

In general terms, the plurality of molding material hoses 42 or other conduits can be said to form a manifold. Accordingly, any other kind of suitable injection molding manifold may be used to connect one or more of the inlet component outlets 36 to one or more of the molding material inlets 116 of nozzles 100 for conveying molding material from inlet component 24 to nozzles 100. For example, the manifold and/or distribution branches described in U.S. Pat. No. 7,465,165 to Fischer et al., which is incorporated in its entirety herein by reference, may also be used.

Conduits, such as hoses, as well as end couplings/fittings may be used to connect the services, as well. In the current embodiment, actuator fluid, e.g., air, is supplied to the nozzles 100 by actuator hoses 46 and coolant is circulated to the nozzles 100 by cooling hoses 48. One of the end couplings for actuator hoses 46, and cooling hoses 48 is indicated at 50. If operating conditions permit, actuator hoses 46, cooling hoses 48 and/or couplings 50 may be of lower grade than the material selected for molding material hoses 42 and couplings 44.

Couplings 44 for the molding material hoses 42, as well as couplings 50 for actuator hoses 46, and cooling hoses 48 may be selected to be different sizes, shapes, configurations, or interfaces to prevent mistaken connections. Likewise, the colour of molding material hoses 42, actuator hoses 46, and cooling hoses 48 can also be selected to prevent mistaken connections.

In the embodiments described herein, which are suitable for injection molding of thermoset resins such as liquid silicone rubber, no heaters are provided in inlet component 24, molding material hoses 42, or nozzles 100. Thermoset molding materials, such as liquid silicone rubber, are generally processed at cool or ambient temperatures until injected into mold cavities 30, where heat or other curing means is finally applied. Aside from thermoset resins, many kinds of foodstuffs can also be injection molded using the embodiments described herein. Generally, any material that does not require heat input in order to flow is a candidate to be injection molded by the embodiments described herein.

Figure 2:
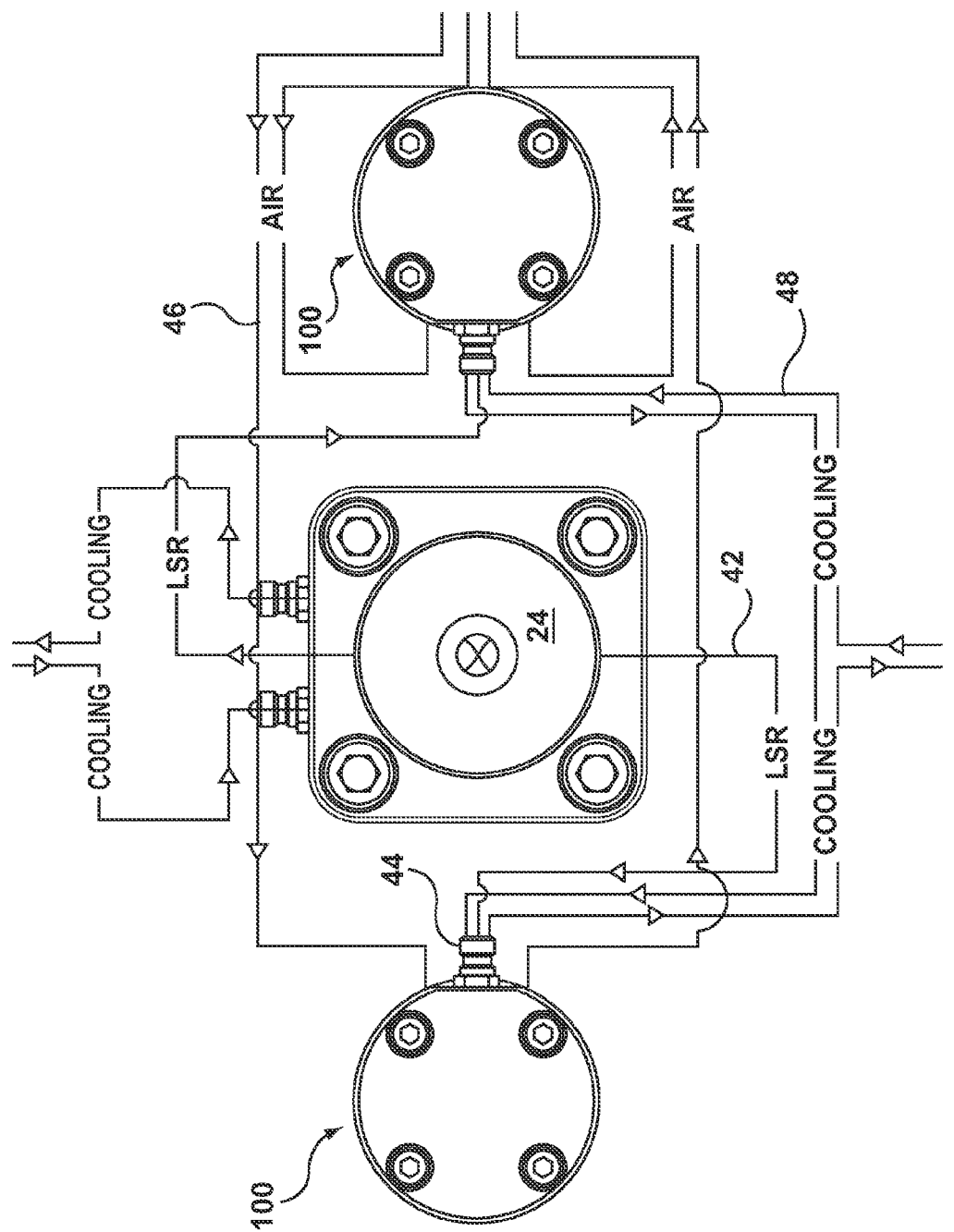
FIG. 2 is a schematic diagram of the routing of the hoses in the injection molding apparatus shown in FIG. 1.

FIG. 2 depicts inlet component 24 and nozzles 100 of injection molding apparatus 10 with a schematic layout of molding material hoses 42, actuator hoses 46, cooling hoses 48, the paths the hoses follow, and the connections made.

FIG. 3 illustrates nozzle 100 of injection molding apparatus 10 in FIG. 1 in perspective view.

Referring to FIG. 3, and well as FIG. 4, nozzle 100 includes, amongst other components, nozzle housing 102 and actuator housing 104. Actuator housing 104 is removably fastened to nozzle housing 102 by bolts or other fasteners 106. Actuator housing 104 includes opening actuation port 110, and closing actuation port 108 into which pressurized actuator fluid can be applied to drive the actuator 122 when the actuator is a fluid driven actuator, e.g., a pneumatic or hydraulic actuator. In the case of an electric actuator, opening actuation port 110, and closing actuation port 108 may be replaced by an electrical wiring terminal or the like (not shown).

As shown in FIG. 4, nozzle housing 102 defines a nozzle core bore 105, and includes a coolant inlet port 112 and a coolant outlet port 114, for circulating a cooling fluid, such as chilled water, within nozzle 100. Further provided in nozzle housing 102 is a molding material inlet 116 for receiving molding material from a connected molding material hose 42 and delivering it to a nozzle channel 140 via a nozzle housing channel 141.

A threaded bushing 118 is located at the downstream end of nozzle 100. Threaded bushing 118 is removably fastened to cavity plate 18 by a threaded engagement shown at 119. Threaded bushing 118 in combination with bolts 120 are provided to fasten nozzle 100 to cavity plate 18. Actuator housing 104, nozzle housing 102, and insulating ring 152 contain bores extending therethrough for accommodating bolts 120.

In the current embodiment a nozzle core 136 of nozzle 100 is removably fastened to cavity plate 18 by threaded bushing 118. However, in other embodiments, other kinds of bushings can be used to connect nozzle core 136 to cavity plate 18; nonlimiting examples of which include: a bushing with bayonet type connection to cavity plate 18 and a bushing which is removably fastened to cavity plate 18 by bolts or other fasteners.

FIG. 4 depicts nozzle 100 of FIG. 3 sectioned along line A-A.

Actuator 122 includes a piston 124 a piston cap 134 a stop 128 and a plurality of Belleville washers 130. Piston 124 is slidably disposed within a piston bore 125 in actuator housing 104. Piston 124 is actuated by a pressurized fluid, e.g. compressed air, applied to either opening actuation port 110, or closing actuation port 108. One or more piston o-rings 127 may be used to seal against actuator fluid leakage when piston 124 is actuated. One or more sealing o-rings 129 may also be provided on the outside diameter of an annular spigot 103 of nozzle housing 102 to seal against leakage of actuator fluid from piston bore 125. A rod seal 121 is located on the inside diameter of annular spigot 103 to seal against leakage of actuator fluid, and to coaxially align piston 124 with nozzle core 136. Valve pin 126 is held in place in piston 124 by stop 128 a plurality of Belleville washers 130 and piston cap 134. Stop 128 is biased in the forward direction by Belleville washers 130 located between piston cap 134 and a flange on the forward end of stop 128. Although Belleville washers 130 are shown, it will be appreciated by one of ordinary skill in the art that Belleville washers 130 could be substituted with any other type of spring provided that it is able to create the required amount of biasing force between piston cap 134 and stop 128. The net effect of the biasing force between piston cap 134 and stop 128 is any excessive axial force $A_F$ acting on valve pin 126 when valve pin 126 is actuated in the closing direction, that is when pressurized fluid is applied to closing actuation port 108, is absorbed by the compression of Belleville washers 130 without damaging valve pin 126 or mold gate 32. Such excessive force may occur if valve pin 126 is obstructed when actuated in the closing direction. For assembly and disassembly proposes piston cap 134 is removably fastened to piston 124 to access Belleville washers 130, stop 128, and valve pin 126. It will be appreciated by one of ordinary skill that the above described actuator is exemplary, and the actuator required to translate valve pin 126 between an open and closed position may contain more or fewer parts, or may take on a different configuration than the actuator described above.

Shown as hidden lines in FIG. 4, bolts 106 removably fasten actuator housing 104 to nozzle housing 102. Also shown with hidden lines, bolts 120 removably fasten nozzle housing 102 and actuator housing 104 to cavity plate 18. With bolts 106 left in place, that is removably fastening actuator housing 104 and nozzle housing 102 together, bolts 120 can be removed from cavity plate 18 such that nozzle housing 102, actuator housing 104, and actuator 122 can be removed from cavity plate 18 as a single unit, allowing access to nozzle core 136. When bolts 106 are subsequently removed, actuator housing 104 can be separated from nozzle housing 102, allowing access to actuator 122.

Nozzle core 136 serves to deliver molding material from nozzle housing channel 141 to mold gate 32 and into a mold cavity (not shown). Nozzle core 136 is generally cylindrical and is composed of two concentric sleeves. Inner sleeve 138 defines a nozzle channel 140. Nozzle channel 140 conveys molding material from nozzle housing channel 141 to mold gate 32 and also accommodates valve pin 126. Inner sleeve 138 and outer sleeve 142 in conjunction with nozzle housing 102 define nozzle cooling channel 143, as described below. Flow of coolant within nozzle cooling channel 143 maintains the molding material in nozzle channel 140 at a temperature below that which would cause the molding material to solidify.

A mounting flange 144 is provided on the downstream end of inner sleeve 138. An upstream surface 145 of mounting flange 144 provides a surface to which a downstream surface 121 of threaded bushing 118 can abut when threaded bushing 118 is removably fastened to cavity plate 18; such that threaded bushing 118 couples inner sleeve 138 to cavity plate 18. Mounting flange 144 further serves to locate nozzle core 136 in a nozzle core locating bore 137 in cavity plate 18. Engagement between threaded bushing 118 and cavity plate 18 may provide a seal against leakage of molding material. On the downstream face of mounting flange 144 are one or more ridges 146 that reduce the surface contact between inner sleeve 138 and cavity plate 18. Air gaps 148 defined by ridges 146 and cavity plate 18 may reduce heat transfer between nozzle core 136 and cavity plate 18. Ridges 146 may also provide a seal against leakage of molding material. The downstream end of inner sleeve 138 also has a molding material outlet 149 through which molding material in nozzle channel 140 travels on its way to mold gate 32 and mold cavity 30 (not shown). The upstream surface of inner sleeve 138 contains a bore 147 for housing an annular ring seal 150. Annular ring seal 150 is provided to seal the interface between inner sleeve 138 and nozzle housing 102 against leakage of molding material. In another embodiment (not shown) ring seal bore 147 and ring seal 150 are omitted, and replaced with an o-ring, and corresponding o-ring groove in the upstream surface of inner sleeve 138.

Outer sleeve 142 is abutted against the upstream surface 145 of mounting flange 144 by nozzle housing 102. To prevent leakage of coolant, o-rings 156 and corresponding o-ring grooves are provided on the outer surface of outer sleeve 142. O-rings 158 and corresponding o-ring grooves are provided on ends of outer sleeve 142 to further prevent leakage of coolant and/or molding material.

An insulating ring 152 is disposed in a rearward facing recess 153 in cavity plate 18 and provides a thermal break between nozzle housing 102 and cavity plate 18. Insulating ring 152 may be made of polymer composite material, or any other material that will reduce the amount of heat transfer between cavity plate 18 and nozzle housing 102. Insulating ring 152 may also provide an additional seal against leakage of molding material. Air gaps 151 and 157 may also serve to reduce heat transfer between cavity plate 18 and nozzle housing 102. Reducing heat transfer from cavity plate 18 to nozzle 100, or any other component in injection molding apparatus 10 may reduce incidences of premature curing of thermoset molding material and subsequently increase the quality of molded products, increase time between maintenance, and/or reduce cycle time.

Also provided in nozzle housing 102 are one or more o-rings 154 and corresponding o-ring grooves in a valve pin clearance bore 155. During operation, o-rings 154 create a fluid barrier between actuator 122, and nozzle channel 140.

In the current embodiment, which is for injection molding thermoset resins such as liquid silicone rubber, no heaters are provided in nozzle 100. Rather, cooling channel 143 is provided within nozzle core 136 to ensure heat-cured thermoset molding material remains in a flowable state. Since cavity plate 18 (not shown) is heated to facilitate the curing of the thermoset molding material, cavity plate 18 may undergo significant thermal expansion such that the position of mold gates 32 relative to inlet component 24 may increase, when compared to the position of mold gates 32 relative to inlet component 24 when cavity plate 18 is in an unheated state. Since nozzles 100 are coupled to cavity plate 18, thermal expansion of cavity plate 18 may also result in movement of nozzles 100 relative to inlet component 24. The flexibility of molding material hoses 42 accommodates the change in position of nozzles 100 as a result of heat expansion of cavity plate 18 without allowing leakage of molding material at either the interface between molding material hoses 42 and inlet component outlets 36 or the interface between molding material hoses 42 and molding material inlet 116 of nozzle 100.

With reference to FIG. 1, during operation, molding material is injected into inlet component 24, through molding material hoses 42, nozzles 100 and into cavities 30. Valve pins 126 are actuated between open and closed position to control the flow of molding material through mold gates 32 and into mold cavities 30 which are heated by heaters 21. Molding material is then cured or otherwise solidified in the mold cavities 30 and the finished parts ejected.

Regarding disassembly of nozzle 100, the following steps may be followed. First, bolts 120 are removed. Nozzle housing 102, actuator housing 104, and subsequently actuator 122 and valve pin 126 are then removed as a unit from cavity plate 18, thereby exposing nozzle core 136, which remains removably fastened to cavity plate 18 by threaded bushing 118. Nozzle housing 102 and actuator housing 104 are separated by removing bolts 106 thereby allowing access to and/or removal of piston 124 and attached valve pin 126. Piston cap 134 is removed from piston 124, and stop 128, Belleville washers 130, and valve pin 126 can be removed from piston 124. Returning to cavity plate 18, threaded bushing 118 is unthreaded, or otherwise unfastened, allowing nozzle core 136 to be removed from cavity plate 18. Lastly, insulating ring 152 may be removed from cavity plate 18.

Inner sleeve 138 and outer sleeve 142 may then be separated from one another, and the nozzle components can be cleaned, e.g., of cured or uncured molding material, and then reassembled following the above steps in reverse order. It may also be desirable to immerse the fully or partially disassembled nozzle 100 in a solvent or other chemical bath for dissolving solidified molding material to assist in cleaning. While cleaning nozzle 100, a substitute nozzle 100 may be removably fastened to cavity plate 18 to allow molding operations to recommence without waiting for cleaning of the removed nozzle 100 to be completed.

Regarding assembly, it should be noted that since each nozzle 100 is sealed against the leakage of molding material individually by tightening the respective threaded bushing 118 and/or bolts 120, leakage of molding material occurring in one nozzle 100 can be rectified without disturbing other nozzles.

Figure 5:
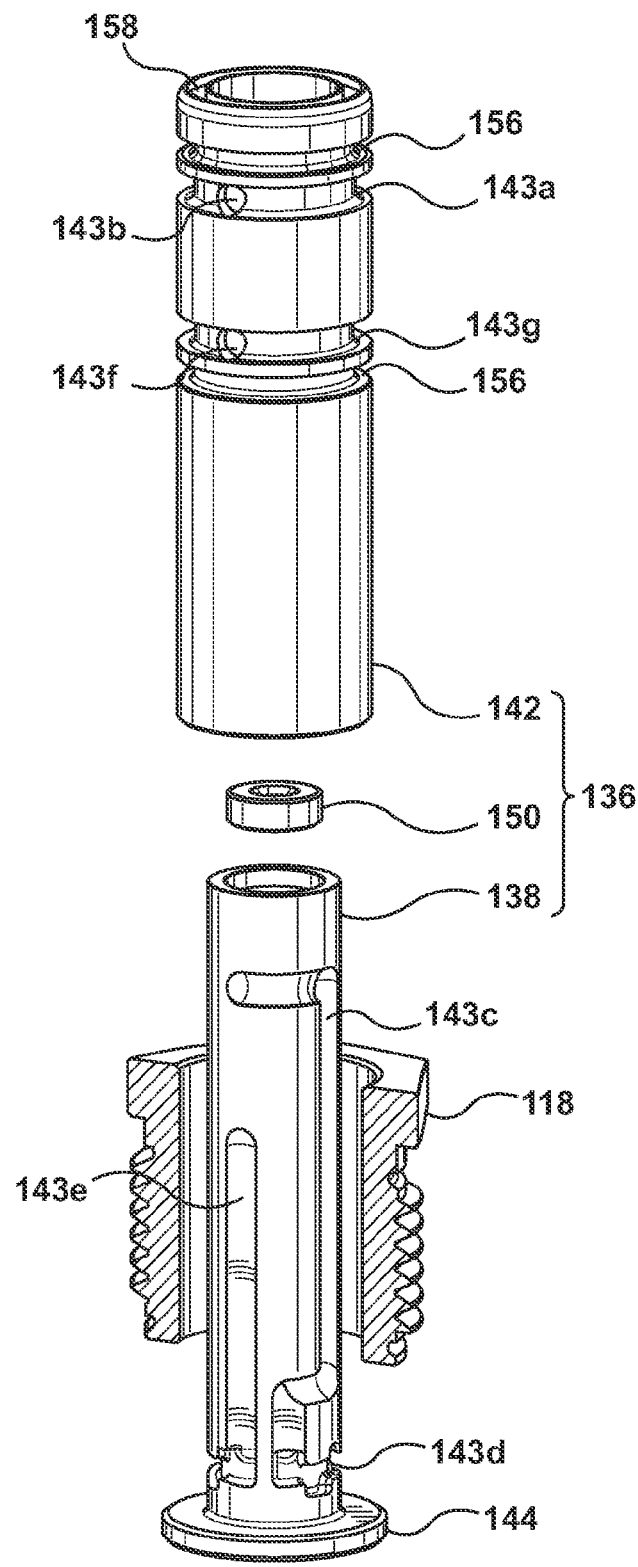
FIG. 5 is an exploded perspective view of the nozzle core and threaded bushing of the nozzle in FIG. 4.

FIG. 5 depicts an exploded perspective view of nozzle core 136 and threaded bushing 118, with threaded bushing 118 being shown in section as well. In this view, portions of cooling channel 143 are identified as 143a-g. After coolant has entered nozzle 100 (not shown) at coolant inlet port 112 (also not shown), it flows into annular supply channel 143a on the outside surface of outer sleeve 142. A supply through-hole 143b extends through outer sleeve 142 and directs coolant radially inward into channel 143c on the outer surface of inner sleeve 138. Coolant then flows towards the downstream end of inner sleeve 138 and into a tortuous, zigzagging groove 143d that nearly circumscribes the downstream end of inner sleeve 138. From there, coolant flows through channel 143e, through return through-hole 143f and into annular return channel 143g. From channel 143g, coolant is expelled from nozzle 100 (not shown) at coolant outlet port 114 (not shown). In an alternative embodiment (not shown) o-rings may also be provided between inner sleeve 138 and outer sleeve 142 near their respective ends to further prevent leakage of coolant.

It will be appreciated by one of ordinary skill in the art that the path of coolant channel 143 described above is exemplary, and could be of any configuration such that it connects coolant inlet port 112 with coolant outlet port 114 and provides sufficient cooling to nozzle core 136, without departing from the scope of the invention. Nonlimiting examples of alternative paths for coolant flow on inner sleeve include: a sinuous cooling channel, a helical cooling channel, a cooling channel defined by a series of longer axial cooling channels connected by shorter circumferential cooling channels or a cooling channel defined by a series of longer circumferential cooling channels connected by shorter axial cooling channels or a combination of any and all of the above mentioned paths. It will also be appreciated by one of ordinary skill in the art that cooling channel 143 need not be provided on the outer surface of inner sleeve 138, but instead could be provided on the inner surface of outer sleeve of 142, or on both the outer surface of inner sleeve 138 and the inner surface of outer sleeve 142.

Figure 6:
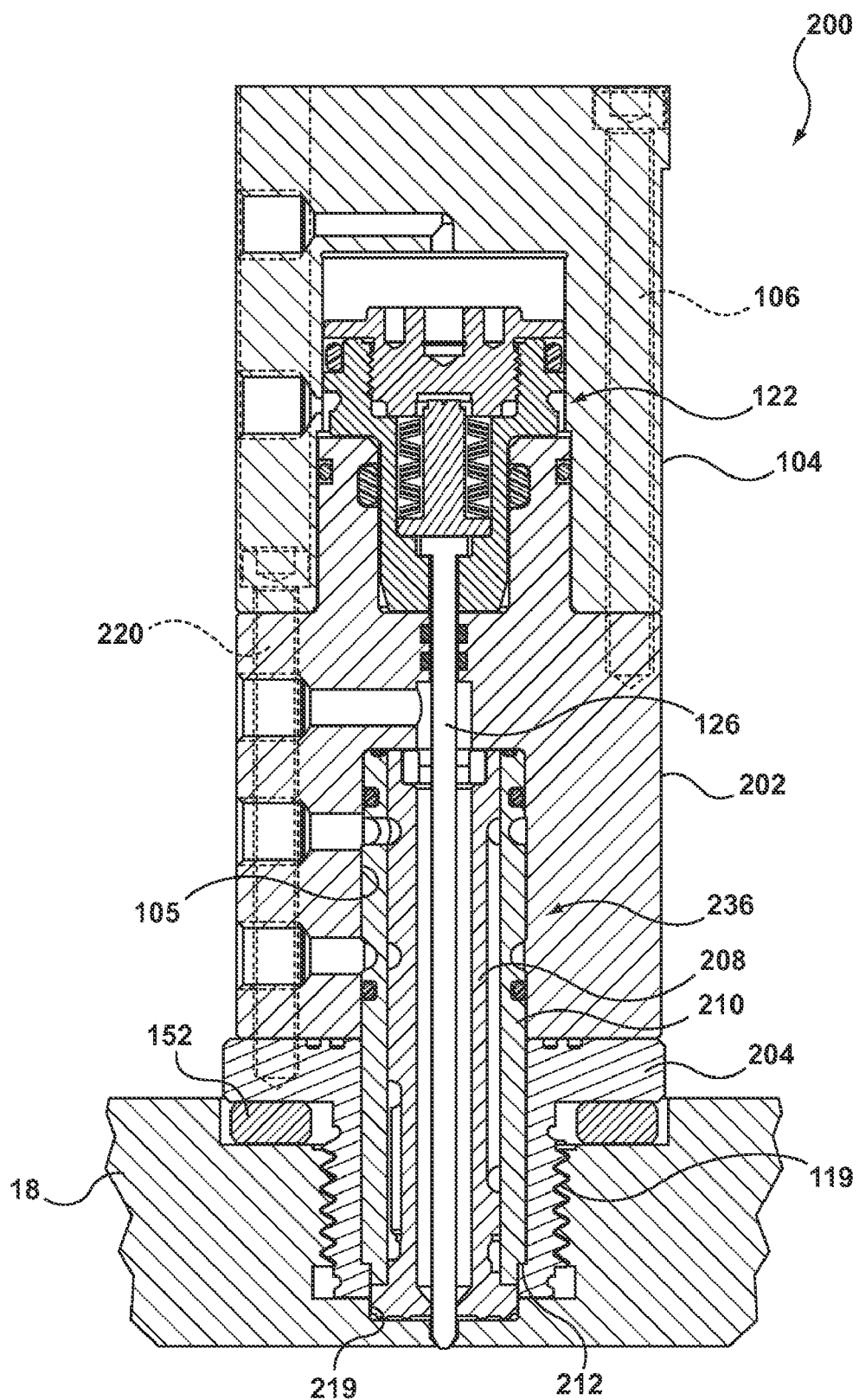
FIG. 6 is a sectional view of nozzle with an integrally fastened nozzle core in accordance with another embodiment hereof.

FIG. 6 shows a nozzle 200 according to another embodiment of the present invention that can be used in injection molding apparatus 10 of FIG. 1 with minor adaptations as would be apparent to those skilled in the art. The features and aspects described for the other embodiments may be used accordingly with the present embodiment. Like parts are the same as those described with respect to FIG. 4, and some of these are indicated with like reference numerals for convenience. Only those parts that differ significantly are discussed in detail.

Nozzle 200 includes a nozzle core 236, and is removably fastened to a threaded bushing 204 by bolts or other fasteners 220 which extend through actuator housing 104 and a nozzle housing 202 into threaded bushing 204. Threaded bushing 204 is removably fastened to cavity plate 18 by a threaded engagement shown at 119. However, threaded bushing 204 could be coupled to cavity plate 18 by others means such as bolts or other fasteners. Nozzle core 236 is held in place between threaded bushing 204 and the upstream face of nozzle core bore 105 by a shoulder 212 in threaded bushing 204. In the current embodiment, an inner sleeve 208 and an outer sleeve 210 of nozzle core 236 are integrally fastened together; non-limiting examples of which include: brazing, soldering and welding. For installation or removal, the assembled nozzle 200 is removably fastened to cavity plate 18 via the threaded connection 119. Alternatively, for removal, bolts 220 can be disengaged from threaded bushing 204 before threaded bushing 204 is decoupled from cavity plate 18; nozzle housing 202, actuator 122, including valve pin 126, and actuator housing 104 can then be removed as an assembled unit to expose nozzle core 236. For installation, threaded bushing 204 can be removably fastened to cavity plate 18 independent of the remaining components of nozzle 200. Nozzle core 236 can be inserted through threaded bushing 204 into a nozzle core locating bore 219 in cavity plate 18; nozzle housing 202, actuator 122, including valve pin 126, and actuator housing 104 can then be installed and removably fastened to threaded bushing 204 via bolts 220.

Figure 7:
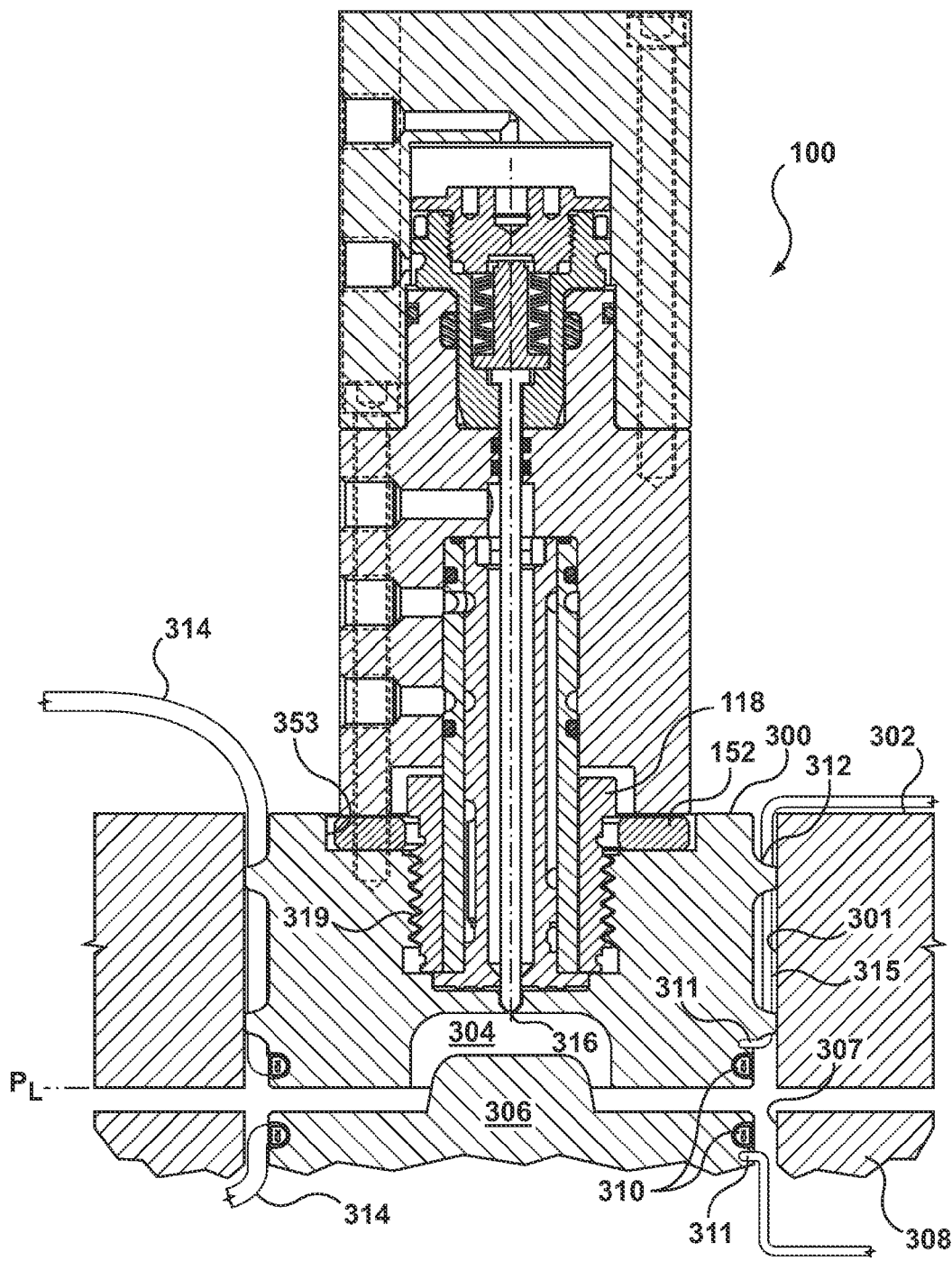
FIG. 7 is an enlarged sectional view of a portion of the injection molding apparatus of FIG. 1 showing heated mold inserts in accordance with another embodiment hereof.

FIG. 7 illustrates heated core and cavity inserts according to an embodiment of the present invention that can be used in injection molding apparatus 10 of FIG. 1 with minor adaptations as would be apparent to those skilled in the art. The features and aspects described for the other embodiments can be used accordingly with the present embodiment. Like parts are the same as those described with respect to FIG. 4, and some of these are indicated with like reference numerals for convenience. Only those parts that differ significantly are discussed in detail.

Heated cavity insert 300 is situated in a cavity insert bore 301 in cavity plate 302. Heated cavity insert 300 together with a heated core insert 306 define mold cavity 304. Heated core insert 306 is situated in a core insert bore 307 in core plate 308. Heated cavity insert 300 and heated core insert 306 as well as cavity plate 302 and core plate 308 are shown separated along a parting line $P_L$ for illustrative purposes.

With regard to nozzle 100, heated cavity insert 300 functions similar to cavity plate 18 discussed above, and as such contains rearward facing recess 353 for receiving insulating ring 152, and is removably fastened to threaded bushing 118 at threaded engagement 319. Heated cavity insert 300 and heated core insert 306 contain heaters 310 such as the embedded insulated resistance wire heaters depicted. It will be appreciated by one of ordinary skill in the art that other types of heaters could also be used; nonlimiting examples of which include: band heaters, film heaters and cartridge heaters. Thermocouples 311 are also provided in heated cavity insert 300 and heated core insert 306 for monitoring the temperature of heaters 310 or the heated cavity insert 300, heated core insert 306, or mold cavity 304 to provide feedback for control of heaters 310. Standoffs 312 on the outside surface of heated cavity insert 300 and heated core insert 306 reduce the amount of surface contact between heated cavity insert 300 and heated core insert 306 with their respective cavity plate 302 and core plate 308 and create insulative air gap 315. Insulative air gap 315 may be filled with another insulative material such as rock wool or similar.

Reducing the amount of surface contact between heated cavity insert 300 and heated core insert 306 and their respective cavity plate 302 and core plate 308 decreases the amount of heat transferred to cavity plate 302 and core plate 308 from heated cavity insert 300 and heated core insert 306 while still locating and heated cavity insert 300 and heated core insert 306 within their respective cavity plate 302 and core plate 308. Heated cavity insert 300 and heated core insert 306 may be secured to their respective cavity plate 302 and core plate 308 by bolts or other fasteners (not shown) or may be held in place by a friction fit or an interference fit created by the thermal expansion of heated cavity insert 300 or heated core insert 306. Electrical leads 314 connect heater 310 to a power source (not shown).

Heated cavity insert 300 and heated core insert 306 provide for heat curing of thermoset injection molding material. Using heated cavity insert 300 and heated core insert 306 instead of providing heat to cavity plate 18 and core plate 20, as depicted in FIG. 1, may also reduce the total power required to cure the newly molded article by virtue of their relatively small masses compared to cavity plate 18 and core plate 20. Heated cavity insert 300 and heated core insert 306 also permit simplified cleaning of the mold cavity 304 and mold gate 316 by being removable from their respective mold plates. Heated cavity insert 300 and heated core insert 306 are also advantageous with regard to the effects of thermal expansion. Localized heating of individual mold inserts will cause all heat expansion to occur radially from mold gate 316.

Figure 8:
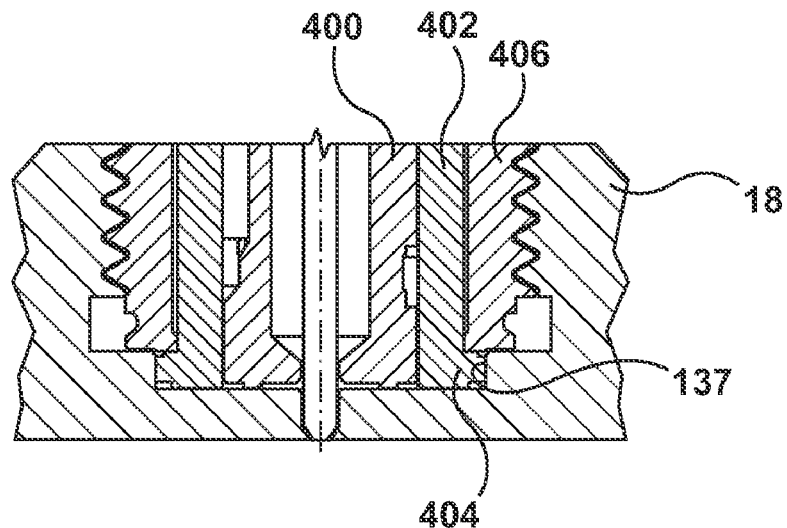
FIGS. 8 and 9 are enlarged sectional views of the downstream end of nozzles in accordance with another embodiment hereof.

FIG. 8 depicts the tip area of a nozzle according to another embodiment of the present invention that can be used in injection molding apparatus 10 of FIG. 1 with minor adaptations as would be apparent to those skilled in the art. Features and aspects described for the other embodiments may be used accordingly with the present embodiment.

Inner sleeve 400 and outer sleeve 402 are integrally fastened together, non-limiting examples of which include: brazing, soldering and welding. A mounting flange 404 is provided on the downstream end of outer sleeve 402 for removably coupling outer sleeve 402 and subsequently inner sleeve 400 to cavity plate 18 by threaded bushing 406. Aside from the integral fastening of inner sleeve 400 and outer sleeve 402, the current embodiment is similar to the embodiment of FIG. 4, except that mounting flange 404 is provided on the downstream end of outer sleeve 402 rather than on the downstream end of inner sleeve 400.

Figure 9:
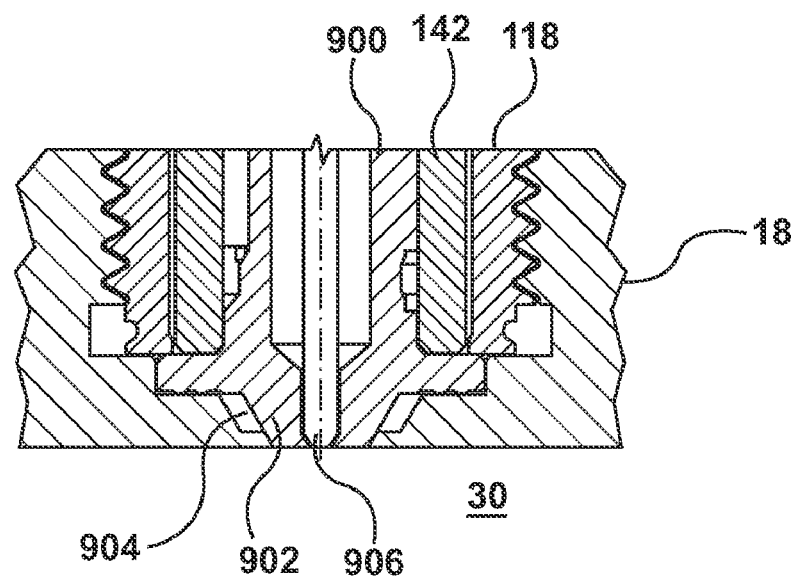

FIG. 9 illustrates the tip area of a nozzle according to another embodiment of the present invention that can be used in injection molding apparatus 10 of FIG. 1 with minor adaptations as would be apparent to those skilled in the art. The features and aspects described for the other embodiments may be used accordingly with the present embodiment. Like parts are the same as those described with respect to FIG. 4, and some of these are indicated with like reference numerals for convenience. Only those parts that differ significantly are discussed in detail.

Inner sleeve 900 has a protruding portion 902 that defines a mold gate 906 and partially defines mold cavity 30. Protruding portion 902 may be separated from cavity plate 18 by an insulative air gap 904. Accordingly, heat transfer between cavity plate 18 and the nozzle may be further reduced.

Regarding materials for making the embodiments described herein, any material suitable for injection molding in general and the specific molding conditions faced may be used.

Although many embodiments of the present invention have been described, those of skill in the art will appreciate that other variations and modifications may be made without departing from the spirit and scope thereof as defined by the appended claims. All patents and publications discussed herein are incorporated in their entirety by reference thereto.

What is claimed is:

1. An injection molding apparatus comprising:
an inlet component having an inlet and a plurality of outlets, the inlet for receiving molding material from a source;
a plurality of nozzles, each nozzle having a molding material inlet and a nozzle channel for delivering molding material through a mold gate and into a mold cavity, each nozzle having an actuated valve pin for opening and closing the mold gate; and
a manifold connected between the outlets of the inlet component and the inlets of the nozzles for conveying molding material from the inlet component to the nozzles,
wherein at least one of the nozzles comprises a nozzle core that defines the nozzle channel for conveying molding material, a cooling channel for flow of coolant to cool the molding material in the nozzle channel, and a nozzle housing in which the nozzle core is disposed, the nozzle housing including coolant ports connected to the cooling channel of the nozzle core and a molding material inlet connected to the nozzle channel.

2. The injection molding apparatus of claim 1, further comprising:
a mold plate adjacent the mold cavity, the mold plate including a bore; and
an insert with a heater coupled thereto, the insert being disposed within the bore and partially defining the mold cavity.

3. The injection molding apparatus of claim 1, wherein at least one of the nozzles is removably fastened to a mold plate, the mold plate defining at least a portion of the mold cavity.

4. The injection molding apparatus of claim 3, wherein the removably fastened nozzle has a threaded bushing that is threaded into the mold plate.

5. An injection molding apparatus comprising:
an inlet component having an inlet and a plurality of outlets, the inlet for receiving molding material from a source;
a plurality of nozzles, each nozzle having an inlet and a nozzle channel for delivering molding material through a mold gate and into a mold cavity, each nozzle having an actuated valve pin for opening and closing the mold gate;
a plurality of hoses, each hose connected between an outlet of the inlet component and an inlet of one of the nozzles for conveying molding material from the inlet component to the connected nozzle; and
at least one rail plate sandwiched between a back plate and the mold plate, the rail plate having a channel for conveying coolant or actuator fluid, and at least one conduit connected between the rail plate and one of the nozzles for conveying coolant or actuating fluid to the nozzle;
wherein the inlet component, the nozzles, and the hoses do not have a heater in contact therewith.

6. The injection molding apparatus of claim 5, wherein at least one of the hoses has sufficient flexibility to allow a human operator to manually adjust the path followed by the hose.

7. The injection molding apparatus of claim 5, wherein at least one of the nozzles is removably fastened to a mold plate, the mold plate defining at least a portion of the mold cavity.

8. The injection molding apparatus of claim 7, wherein the removably fastened nozzle has a threaded bushing that is threaded into the mold plate.

9. The injection molding apparatus of claim 5, further comprising:
- a mold plate adjacent the mold cavity, the mold plate including a bore; and
- an insert with a heater coupled thereto, the insert being disposed within the bore and partially defining the mold cavity.

10. An injection molding apparatus comprising:
- an inlet component having an inlet and a plurality of outlets, the inlet for receiving molding material from a source;
- a plurality of nozzles, each nozzle having an inlet and a nozzle channel for delivering molding material through a mold gate and into a mold cavity, each nozzle having an actuated valve pin for opening and closing the mold gate; and
- a manifold connected between the outlets of the inlet component and the inlets of the nozzles for conveying molding material from the inlet component to the nozzles;
- wherein at least one of the nozzles comprises a nozzle core that defines the nozzle channel for conveying molding material and a cooling channel for flow of coolant to cool the molding material in the nozzle channel, the nozzle core having two concentric sleeves and the cooling channel being disposed between the sleeves.

11. The injection molding apparatus of claim 10, wherein at least one of the nozzles is removably fastened to the mold plate by a bushing.

12. The injection molding apparatus of claim 11, wherein the removably fastened nozzle has a nozzle core that has a lip against which the bushing abuts.

13. The injection molding apparatus of claim 12, wherein the removably fastened nozzle is thread connected to the mold plate.

14. The injection molding apparatus of claim 10, wherein the at least one nozzle further comprises a nozzle housing in which the nozzle core is disposed and wherein the nozzle housing has coolant ports connected to the cooling channel of the nozzle core and a molding material inlet connected to the nozzle channel.

15. The injection molding apparatus of claim 11, wherein at least one nozzle comprises an actuator connected to the valve pin for actuating the valve pin between opened and closed positions.

16. The injection molding apparatus of claim 15, wherein the at least one nozzle further comprises an actuator housing in which the actuator is disposed and wherein the actuator housing has fluid ports and the actuator is driven by pressurized fluid applied to the fluid ports.

17. An injection molding apparatus comprising:
- an inlet component having an inlet and a plurality of outlets, the inlet for receiving molding material from a source;
- a plurality of nozzles, each nozzle having an inlet and a nozzle channel for delivering molding material through a mold gate and into a mold cavity, each nozzle having an actuated valve pin for opening and closing the mold gate;
- a manifold connected between the outlets of the inlet component and the inlets of the nozzles for conveying molding material from the inlet component to the nozzles; and
- at least one rail plate sandwiched between a back plate and the mold plate, the rail plate having a channel for conveying coolant or actuator fluid, and at least one conduit connected between the rail plate and one of the nozzles for conveying coolant or actuating fluid to the nozzle.

18. The injection molding apparatus of claim 17, wherein at least one of the nozzles is removably fastened to the mold plate by a bushing.

19. The injection molding apparatus of claim 18, wherein the removably fastened nozzle has a nozzle core that has a lip against which the bushing abuts.

20. The injection molding apparatus of claim 19, wherein the removably fastened nozzle is thread connected to the mold plate.

21. The injection molding apparatus of claim 18, wherein the bushing is thread connected to the mold plate.

22. The injection molding apparatus of claim 17, wherein at least one nozzle comprises an actuator connected to the valve pin for actuating the valve pin between opened and closed positions.

23. The injection molding apparatus of claim 22, wherein the at least one nozzle further comprises an actuator housing in which the actuator is disposed and wherein the actuator housing has fluid ports and the actuator is driven by pressurized fluid applied to the fluid ports.

* * * * *